Nov. 20, 1951     W. R. PARVIN     2,575,767
SAFE DEPOSIT BOX IDENTIFYING MEANS
Filed June 4, 1948
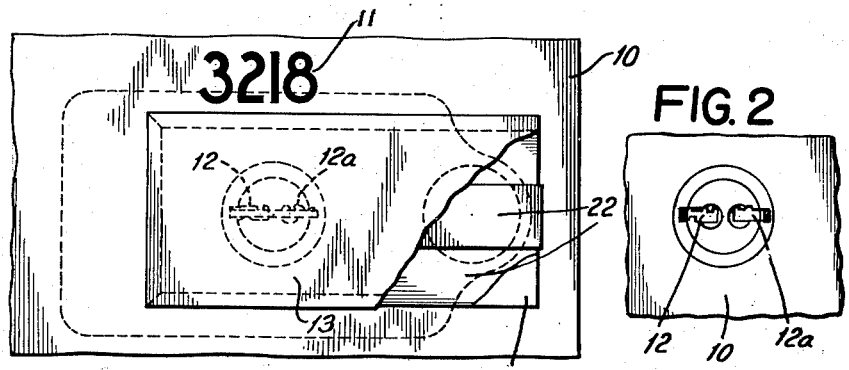
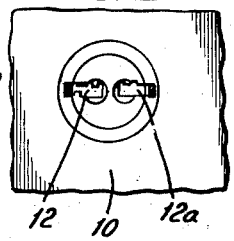
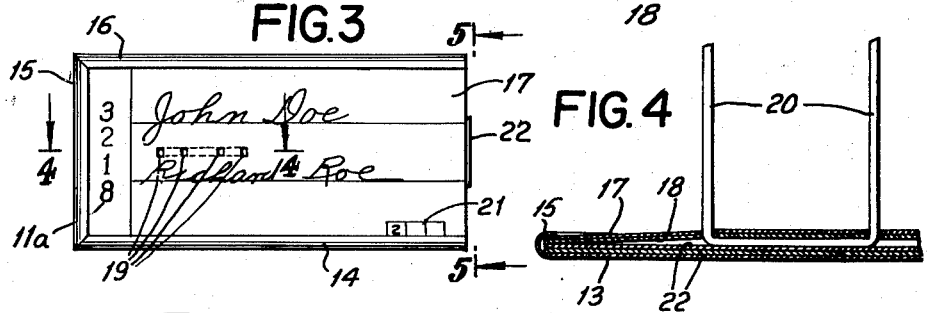
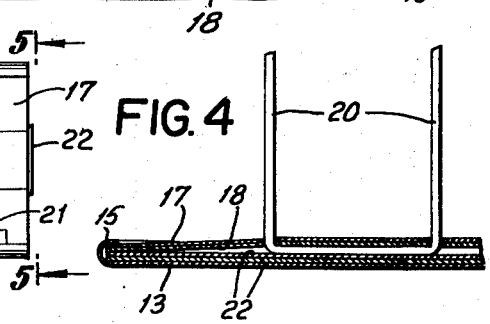
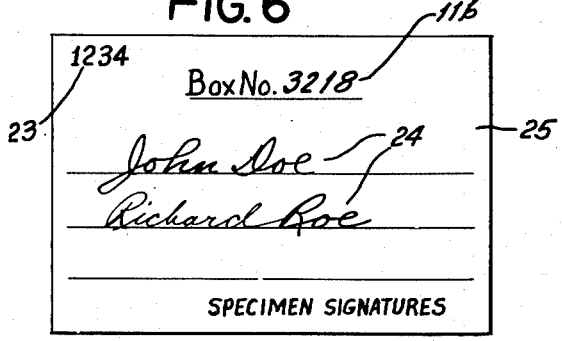
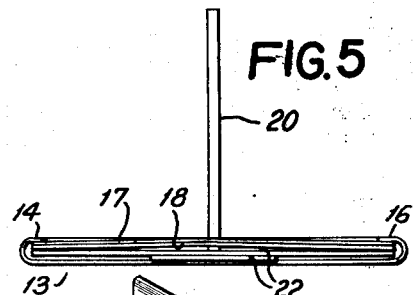
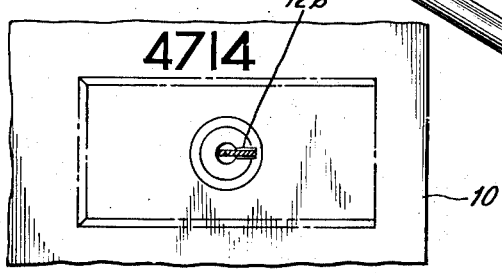
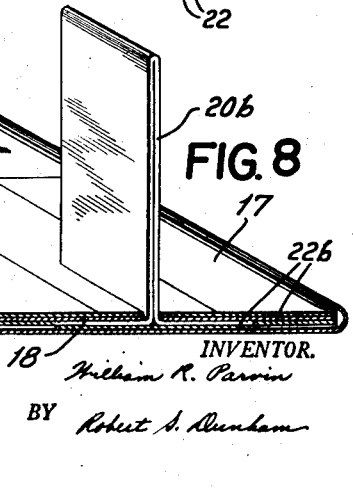
INVENTOR.
William R. Parvin
BY Robert A. Dunham
ATTORNEY Patented Nov. 20, 1951

2,575,767

UNITED STATES PATENT OFFICE 2,575,767

SAFE DEPOSIT BOX IDENTIFYING MEANS

William R. Parvin, New York, N. Y.

Application June 4, 1948, Serial No. 31,192

3 Claims. (Cl. 40—10)

This invention relates to safe deposit box identifying means.

At the present time safe deposit boxes are usually provided with dual keys, one key being in the possession of the user and the other being a guard key which is kept by the custodian of the safe deposit establishment. Some of the safe deposit doors are provided with dual keyholes or key receiving means while others are provided with a single keyhole or key receiving means.

The actual identification of the safe deposit user is effected in several ways. By one method the user notifies the custodian of his box number and the custodian is frequently expected to remember and personally identify the user and his box number by pure memory method.

In other cases signature systems are utilized. The signature systems, while in some respects more secure than the personal identification systems, are usually time-consuming and present other disadvantages.

The present invention relates to and has for its general object the provision of apparatus for safe deposit user identification which will afford both increased identification security as well as affording time-saving both to the user and to the safe deposit box custodian.

In general, the improved system and apparatus contemplates the system of a set of user slips which are signed by the user with the name or names of those authorized to have access to the box. The user also writes on this slip the box number. Having filled out this slip in the presence of a safe deposit employee, the user takes the slip to the vault custodian and hands it to him. A vault custodian notes the box number from the slip, proceeds to that particular safe deposit box and removes from the front of the safe deposit box a signature card holder, which is retained on the safe deposit box door by parts which engage the keyholes or keyhole therein. The signature card carrier has an opaque back portion which conceals the signature card within the carrier. After removal of the signature card carrier, the vault custodian reverses the carrier and then visually compares the signature or signatures on the slip with the signature or signatures on the card within the carrier. If the signatures compare, the vault custodian then allows access to the box in question.

In the drawings:

Figure 1 shows a front view of a single safe deposit box with the signature card carrier in position thereon;

Fig. 2 is a detailed view showing the dual keyholes for the type of lock used with the box shown in Fig. 1;

Fig. 3 is a view of the signature card carrier after removal from the box and after reversal;

Fig. 4 is a detailed sectional view taken on line 4—4 of Fig. 3;

Fig. 5 is an end elevational view taken substantially on line 5—5 of Fig. 3 and looking in the direction of the arrow;

Fig. 6 is a view showing the user identification slip after being filled out; and Figs. 7 and 8 show a modified embodiment of signature carrier attached for a single keyhole type of lock, as shown in Fig. 7.

In more detail, in the drawings 10 designates the front of a safe deposit box door. This door is provided with the usual identifying number 11. The door is likewise provided with dual keyholes 12 and 12a.

According to the embodiment of the invention shown in Fig. 7, the safe deposit box door 10 is provided with a single keyhole here designated 12b.

Referring now to Figs. 1, 2 and 3, the signature card carrier is preferably made of metal having an opaque back portion 13 and turned over marginal edge portions 14, 15 and 16. Carried within the signature card holder and retained in position by the marginal edge portions 14, 15 and 16 is an assemblage of sheets which comprise the topmost transparent element or sheet 17, preferably formed of celluloid or like transparent material. Below transparent element 17 is the signature sheet proper, this being designated 18 (see Fig. 4). The transparent element 17 is preferably perforated with a plurality of perforations generally designated 19. 20 designates a keyhole engaging means which is in the form of a U-shaped element, the legs of the U extending through perforations in the signature card 18 and through certain of the perforations 19 in the transparent element. The purpose of providing the plurality of perforations 19 in the transparent element is to provide for the use of keyhole engaging elements of different widths. While ordinarily a safe deposit vault has keyhole constructions which are identical throughout the vault, in certain instances there are variations in the keyhole spacing so that many keyhole engaging elements of different widths are required.

It will be understood that the signature card 18 is signed by the user or users at the time the safe deposit box is rented. Preferably also the signature card will carry a numeral designation, 11a, which corresponds with the box number. The signature card may also have a space such as designated at 21 wherein the numeral 2, 3, etc. may be written signifying the number of users having access to the box or for other purposes. The space below the signature card 18 and between it and the opaque back portion 13 may be used for the insertion of additional signature sheets or other identifying material which is generally designated 22 in Figs. 4 and 5.

Referring now to Fig 6, this shows a user slip. These may be serially numbered with serial number 23 and the user will write in the box number as indicated at 11b. The user or users will also write in the authorized signature or signatures as indicated at 24. If desired, the user or access slips 25 may be made of paper with a color which varies from day to day.

The mode of use will be readily understood. The user approaches one of the safe deposit vault employees and is presented with the blank access slip 25 which the user signs with the proper signature or signatures and at the same time writes in the box number 11b on the access slip. The user, or, if desired the safe deposit employee, then presents the access slip to the vault custodian. The vault custodian reads the box number 11b from the access slip and then goes to the related and correspondingly numbered safe deposit box 10. The custodian then grasps the signature card carrier and bodily removes it from the box and reverses it to present the signature in visible relation in the manner shown in Fig. 3. The custodian then compares the signature or signatures on the access slip with the signature or signatures on the signature card 18. If they match, access is granted. Thereafter the vault custodian replaces the signature card carrier on the front of the box with the keyhole engaging means engaging the keyholes in the box. With the parts in this position, the signature on the carrier will be obscured from other box users.

In some cases, safe deposit boxes may have a single keyhole 12b in which case a different form of keyhole engaging means may be used. Preferably such keyhole engaging means 20b may comprise a piece of bent up sheet metal having a general T-shaped configuration. The upstanding part of 20b, as before, passes through a slot in the transparent element 17 and also through a slot in the signature card 18.

Supplemental signature slip 22b may also be used with this embodiment.

What is claimed is:

1. An identification device adapted for application to the key receiving means of a safe deposit box door for concealing a comparison signature when the device is on the door and for immediately displaying the signature upon removal of the device from the door and upon mere reversal of the device, said device comprising a frame with marginal edge portions on an opaque back portion and open at one end to slidably receive a signature card, a signature card in the frame with a signature presenting surface directly and immediately visible when inspected with the device removed from the door and reversed and with the signature facing the door and concealed when the device is mounted in said key receiving means, and engaging means with portions underlying the signature card and other portions extending through the card and extending perpendicularly beyond the signature presenting surface of the card for engagement with the key receiving means of the door, said extending portions providing engaging means for removably retaining the device on the door and for thus concealing the signature while affording manual removal of the device from the door for subsequent reversal and for immediate signature inspection.

2. The invention according to claim 1 wherein the engaging means comprises a U-shaped member projecting through spaced perforations in the signature card for engagement with dual keyholes in the safe deposit box door.

3. The invention according to claim 1 wherein the engaging means comprises a bent sheet metal member of T-shaped configuration with the branch portions underlying the signature card and the upstanding portion extending through the signature card for engagement with a single keyhole in the box door.

WILLIAM R. PARVIN.

REFERENCES CITED

The following references are of record in the file of this patent:

UNITED STATES PATENTS

| Number | Name | Date |
|---|---|---|
| 743,831 | Cota | Nov. 10, 1903 |
| 1,484,887 | Hyatt | Feb. 26, 1924 |
| 1,730,007 | Hemenway | Oct. 1, 1929 |
| 2,328,807 | Hoofer | Sept. 7, 1943 |